United States Patent
Korhonen et al.

[11] Patent Number: 5,627,321
[45] Date of Patent: May 6, 1997

[54] METHOD OF STRAINING A DIAPHRAGM AND A DEVICE THEREFOR

[75] Inventors: Jukka Korhonen, Vantaa; Gustaf Järnefelt, Helsinki, both of Finland

[73] Assignee: Instrumentarium Corporation, Finland

[21] Appl. No.: 491,744

[22] Filed: Jun. 19, 1995

[30] Foreign Application Priority Data

Jun. 17, 1994 [FI] Finland ................................. 942920
Jun. 13, 1995 [FI] Finland ................................. 952881

[51] Int. Cl.⁶ ........................ G01L 7/08; G01R 3/00
[52] U.S. Cl. ........................ 73/715; 29/451; 29/448; 29/595
[58] Field of Search ................ 29/451, 448, 450, 29/594, 595; 220/203.01, 203.12, 203.16, 203.18, 203.25; 361/283.4; 73/715–728, 703

[56] References Cited

U.S. PATENT DOCUMENTS 3,249,833  5/1966  Vosteen.
3,834,543  9/1974  Dreves ........................... 29/450 X
4,313,480  2/1982  Becker ........................... 73/715 X
4,633,705  1/1987  Merilainen et al. ................ 73/31.04
5,174,158  12/1992  Kremidas .......................... 73/756

FOREIGN PATENT DOCUMENTS 226781   6/1969  Sweden.
971521   9/1964  United Kingdom.
1164349  9/1969  United Kingdom.
2188155  9/1987  United Kingdom.

OTHER PUBLICATIONS

*Transducer Allows Accurate Measurement of Corrosive Gas Pressures*, National Bureau of Standards Technical News Bulletin, vol. 49 (11–65), pp. 182–183.

Primary Examiner—Sandra L. O'Shea
Assistant Examiner—Joseph L. Felber
Attorney, Agent, or Firm—Andrus, Sceales, Starke & Sawall

[57] ABSTRACT

A method of straining a diaphragm and a device therefor. The diaphragm (3) is placed between two preferably ring-shaped frame parts (1, 2). In addition at least between one frame part (1, 2) and the diaphragm (3) is placed a resilient body (4), which touches the frame parts when they are pressed against each other.

32 Claims, 8 Drawing Sheets

METHOD OF STRAINING A DIAPHRAGM AND A DEVICE THEREFOR

BACKGROUND OF THE INVENTION

The objective of the invention is a method of straining a diaphragm and a device therefor.

Strained diaphragms are e.g. used in pressure sensor diaphragms, especially in diaphragms of a capacitive differential symmetric pressure sensor, and in microphone diaphragms. Microphones, that change the pressure variations of the acoustic waves into current amperage, have to be made very accurately, as even small pressure variations in the diaphragm have to be considered. In pressure sensors measuring extremely small pressure variations, e.g. 10 Pa, the diaphragm which moves with the pressure variations, has to be correctly strained. In these applications the even strain of the diaphragm throughout its whole surface is essential. Different methods are used to attach and strain such diaphragms. In one prior art solution, the diaphragm is attached between two rings placed within each other. The diaphragm is initially placed on top of e.g. one ring. Thereafter the rings are placed within each other. The internal diameter of the one ring is essentially the same as the exterior diameter of the other ring. The inner ring is provided with a female thread. The diaphragm is pressed between the external surface of the one ring and the internal surface of the other ring. The measurements of the rings must be accurate in order not to tear the thin diaphragm, and the mechanical manufacture of these parts requires accurate devices and adaptions.

In another method, as presented in FIG. 1, the diaphragm is placed on top of a ring provided with a female thread, and the diaphragm can be welded on top of the ring. The method requires special equipment for the welding of the thin diaphragm.

In the rings described above, the diaphragm 3 is attached to the ring 21 in the ways described above, and the ring 21 is provided with an interior female thread, by which it is further fastened to the male thread 27 of the frame 22, which can be a bush. When the ring 21, to which the diaphragm 3 is attached, is screwed into the bush 22, by its male threads 27, the diaphragm 3 touches the surface 26 of the bush 21 close to the closed-position, and by further screwing the bush, the diaphragm is strained to its desired tension. In these methods, really accurate measures are required for e.g. the dimensions of the rings or bushes, the threads, the shapes of the rings, etc., in order not to tear the diaphragm and to attach the ring and the frame within each other. Expensive devices are also required for the manufacture of the rings and the plate. The even straining of the diaphragm has especially created a problem. The diaphragm is strained by turning the bush 22 horizontally in relation to the ring 21, and the diaphragm is strained against the surface 26, by which the diaphragm of the present invention might move in the turning direction of the bush on the surface 26, which in turn might wrinkle the diaphragm.

The SE-patent 226781 presents a solution, in which a resilient body is placed between the diaphragm and the frame so that the diaphragm is not provided between the grooved member and the resilient body.

SUMMARY OF THE INVENTION

The fastening and straining method according to the subject invention provides a decisive improvement over the above mentioned disadvantages. The embodiment of the method according to the invention is characterized in what is presented in the claims.

The most important advantage of the subject invention is that the frame parts provide an even strain of the diaphragm in all directions. The straining parts can easily be modified as desired. The strained diaphragm can be connected to conduct electricity or to be non-conductive. The frame structure can be assembled and disassembled several times.

More than one diaphragm can be strained on top of each other. The structure secures gas tightness on both sides of the diaphragm. Moderate price equipment can be used for the straining of the diaphragm. The diaphragm can be strained simultaneously and evenly throughout the diaphragm and also away from the center of the diaphragm. The straining of the diaphragm can moreover be adjusted and increased. Strained diaphragms of different size can be formed, and also strained diaphragms of different shape can preferably be provided.

BRIEF DESCRIPTION OF THE DRAWINGS

The invention is presented below with reference to the attached drawings.

DETAILED DESCRIPTION OF THE PREFERRED EMBODIMENT

Figure 1:
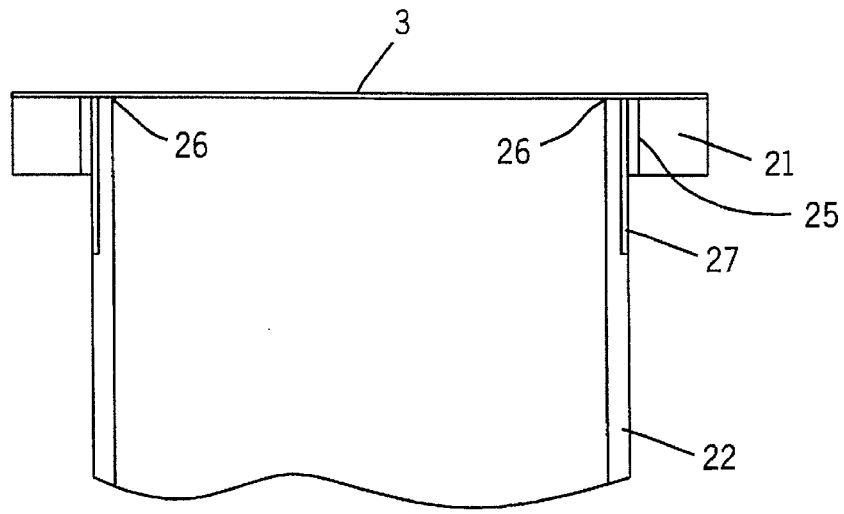
FIG. 1 presents a prior art solution of a diaphragm straining.
Figure 2:
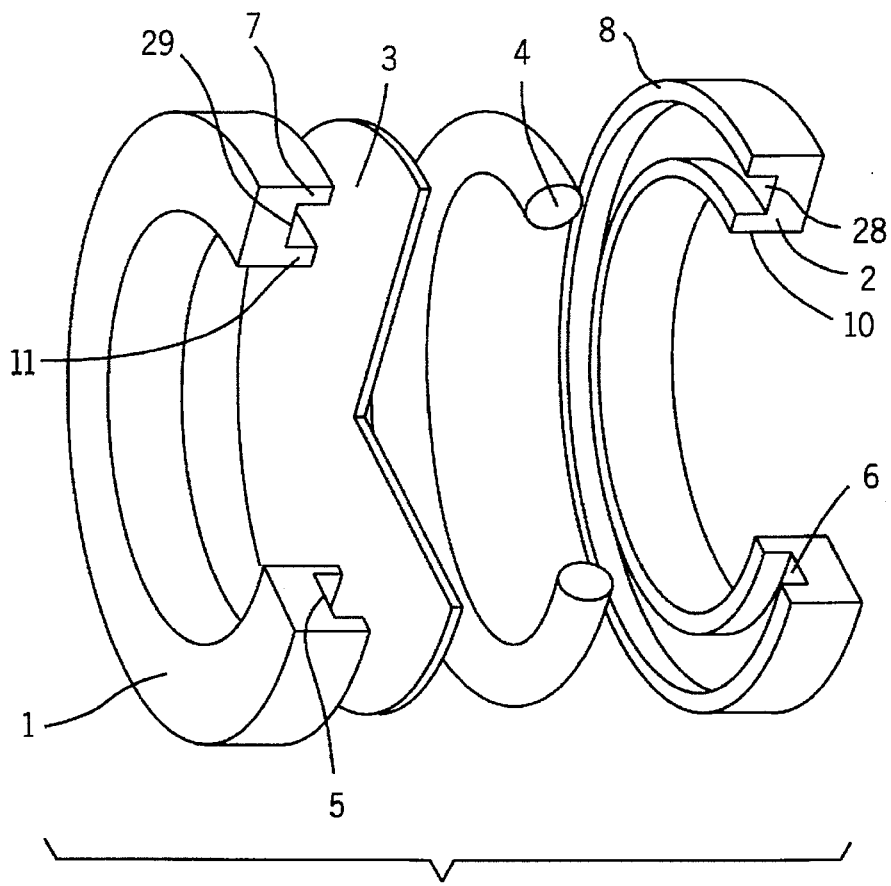
FIG. 2 shows a partly sectional view of the rings and the diaphragm of the present invention before straining and fastening.

FIG. 2 shows a partly sectional view of the construction according to the invention. In FIG. 2 e.g. a thin metal diaphragm 3 has been placed between the two frame parts 1 and 2, and a resilient body 4 has been placed between one frame part 2 and the diaphragm 3, the head and rear ends of the resilient body 4 are joined to form a ring-like structure, and which body is provided with an opening in the middle. The resilient body can be an O-ring packing. The surfaces of the frame parts 1 and 2 to be pressed together have been provided with ring-shaped grooves 5 and 6 for the O-ring packing, which grooves form together the intermediate surface of the adjacent parallel projections, and which grooves preferably circle on the surface of the frame part. The grooves 5 and 6 facing each other, are adapted to coact each other. When pressing the O-ring packing, which is preferably of rubber or of a rubber-like material or the like, the friction keeps the diaphragm strained, and does not allow its slacking during the pressing. The straining is carried out essentially from the center of the frame parts evenly outwards by moving the frame parts only toward each other without turning the frame parts. When the device shown in FIG. 2 is in the fastened position, the O-ring packing can compress against the walls of the grooves, as shown in FIG. 3.

Figure 3:
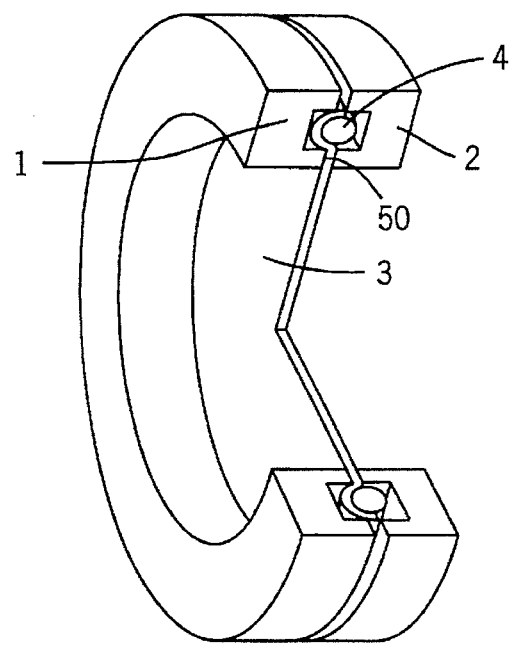
FIG. 3 shows a partly sectional view of the straining and fastening device of the diaphragm.

Although the frame parts 1 and 2 in FIGS. 2 and 3 have been presented essentially as ring-shaped, they can be two levels, with or without openings, which can be placed on top of each other, being, however, preferably ring-shaped. Instead of a metal diaphragm, a diaphragm made of desired material can be used. The resilient body 4 can instead of a circular body be e.g. with respect to its profile a rectangular resilient body, which preferably can be used when two gas chambers are to be separated from each other, but still to transmit the pressure shocks of the one gas chamber to the other. In a microphone embodiment a ring-shaped resilient body with an essentially circular cross-section is preferably used, against which body the diaphragm is pressed. The material of the resilient body can be e.g. rubber, plastic, or the like.

Figure 4:
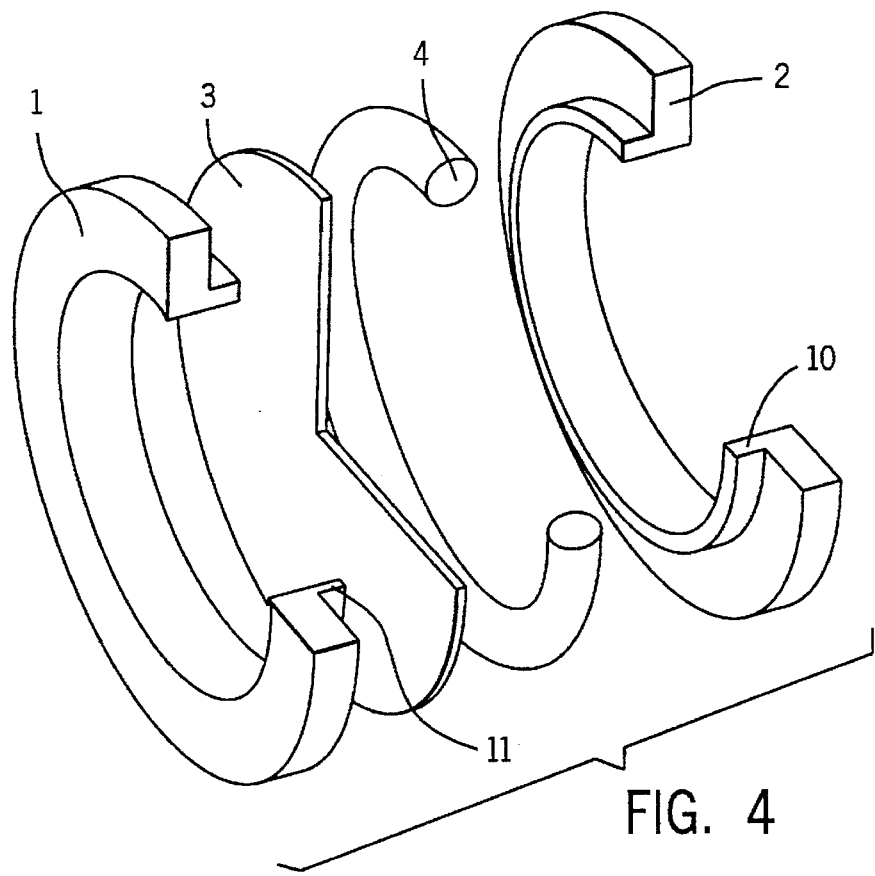
FIG. 4 shows a partly sectional view of a device having protruding frame parts.
Figure 8:
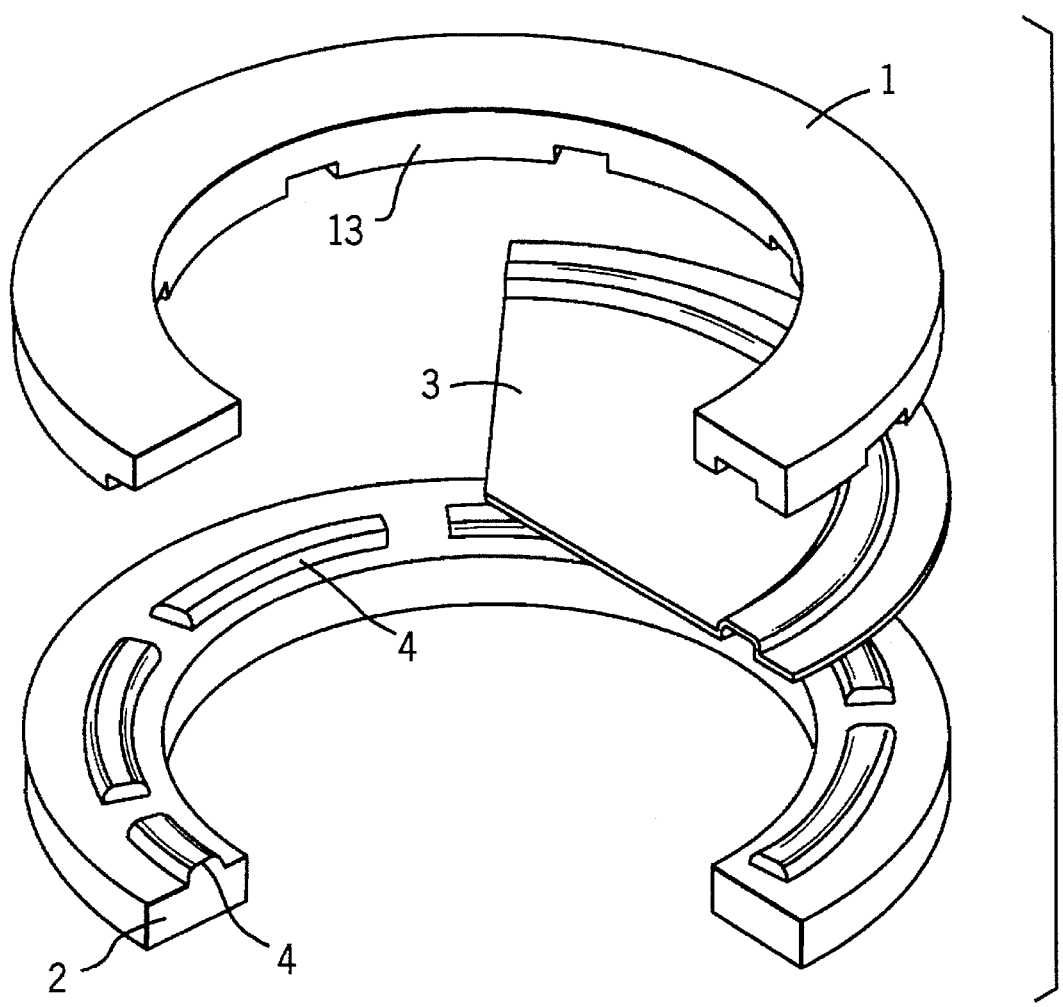
FIG. 8 shows an exploded view of one embodiment of the straining device.

The strain of the diaphragm can be adjusted into different tensions by changing the thickness and the size of the O-ring and/or the depth and the width of the grooves. The tension can be affected by altering the symmetry of the groove depths. The groove can be left out of the one frame part, by which only the other frame part on the side of the resilient body is provided with a groove, the other one having a plane level, or the groove of the one frame part can be lower than the groove of the other frame part. Instead of the frame part groove, the frame part can be provided with only one wall, as shown in FIG. 4, by which e.g. the projections 10, 11 are protruding against each other from the bottoms 28, 29 of the frame part grooves, respectively. The projections 10, 11 are surrounded by the resilient body 4. The opposite surfaces of the projections 7, 8, 10, 11 can be made discontinuous, by which the projection is formed of several spaced apart sections 13, as shown in FIG. 8, or the projection is preferably solid, as in FIGS. 2, 3 and 4. The vertical walls of the projections can be made inclined, as the part 12 in FIG. 5, or they can be convex or concave. The projections 7, 8, 10, 11 of the different frame parts can be of different height.

The surface of the resilient body, as displayed in cross-section, can be made even, or it can have peripheral grooves or cuts, i.e. essentially an asterisk cross-section. The O-ring can be substituted by a resilient body, being of resilient material.

The diaphragm can be pre-strained by the friction of the resilient body, when the diaphragm is put between two opposite frame parts in contact with the resilient body, and the resilient body is supported against a support or a projection between the diaphragm and the frame thus preventing or at least hampering the movement of the resilient body towards the center. The final mechanical locking of the diaphragm is carried out by pressing it between the surfaces of the opposite frame parts. The compressed state can be maintained e.g. by keeping the frame parts fastened to each other by a screw connection or by placing the device into a special space, e.g. between two walls in contact with the frame walls. Generally, the diaphragm 3 and the resilient body 4, or the frame part, are glued together, as shown in FIG. 3 at 50, and an even strain throughout the diaphragm surface is achieved by pressing it between the frame parts. The not-glued parts are detached when the glue has dried.

The frame parts can also be attached by e.g. hinges, by which the frame parts can be opened and closed. The pivoted axle of the hinge is in the outer periphery of the frame parts.

Figure 5:
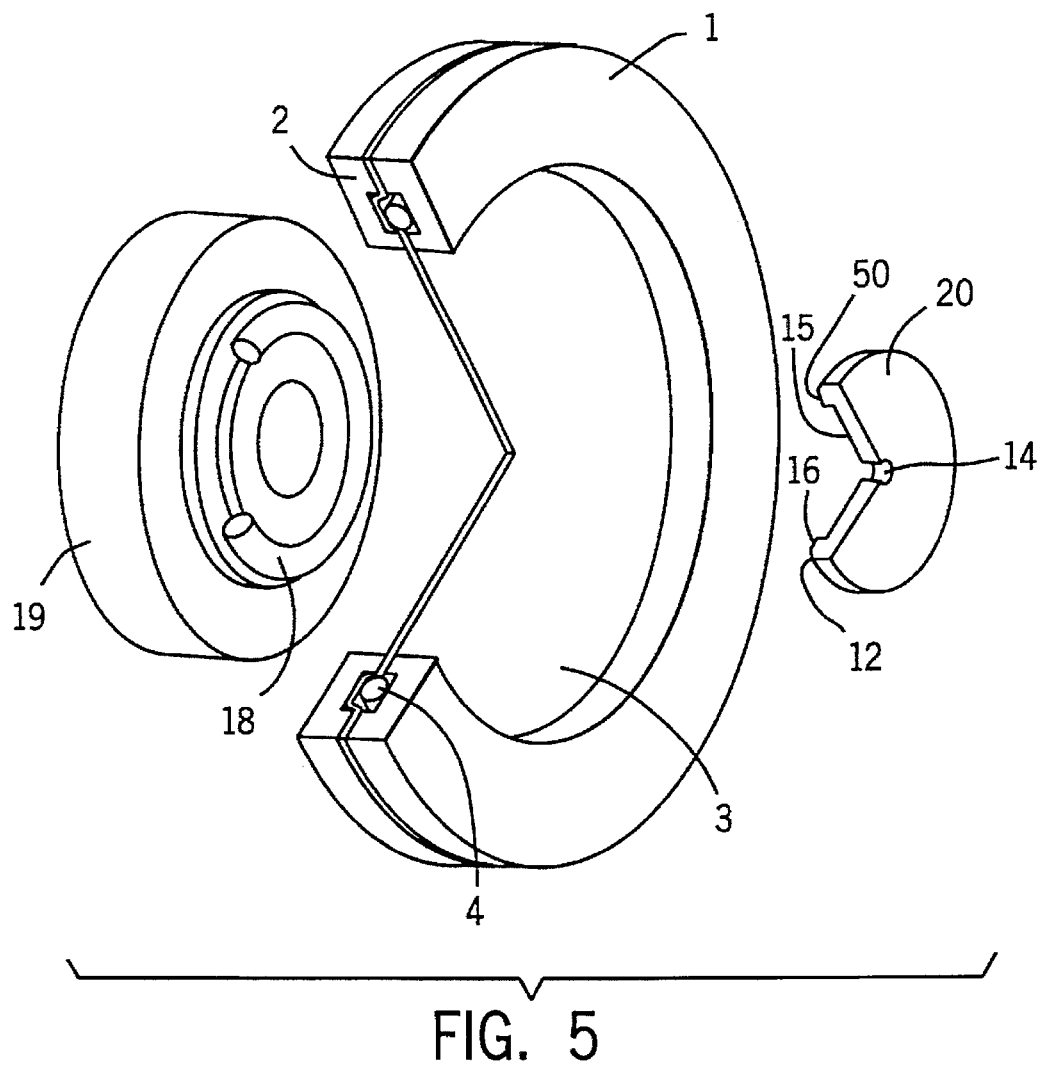
FIG. 5 presents an exploded view and a partly sectional view of one embodiment of the invention.

FIG. 5 shows an embodiment of the invention, in which the diaphragm 3 is strained between the frame parts 1 and 2 by means of a separate resilient body 4, initially on a bigger area, whereafter the diaphragm is strained on an area smaller than the initial one. The fastening frame 20 of the diaphragm has been provided with a groove 12, into which glue 50 has been spread, preferable throughout the whole groove, when a glue connection is desired. When pressing, the movement of the resilient body inwards is prevented by the projection remaining inside the resilient body, which projection can also be an inclined surface, by which when pressing the resilient body "stretches outwards". The projection can be a convex surface for the steering of the resilient body. The external diameter of the frame 20 is smaller than the diameter of the strained diaphragm 3, the straining of which has already been carried out according to the above mentioned methods. The frame 20 has been provided with a hole 14 and a recess 15 in order to conduct the pressure. When the diaphragm 3 is desired to fasten to the frame 20, the frame 20 is brought against the strained diaphragm 3. The diaphragm can be strained by pushing the frame 20 against the diaphragm 3, so that the diaphragm is protruding from the pushing and strains against the frame surface 16, which is a projection and the diaphragm forms preferably a circle against the surface 16. When a suitable strain of the diaphragm has been achieved, the frame 19 from the opposite side of the diaphragm is brought against the diaphragm 3, which frame is provided with a resilient body 18, which has been adapted and directed into the frame 20 glue-groove 12, which in fact is an inclined surface, thus enabling the gradual straining of the resilient body and the diaphragm while pushing the diaphragm against the resilient body. The resilient body 18 in the frame 19 is pressed tightly against the diaphragm 3, whereby the diaphragm is adhered to the glue in the groove 12. The glue is allowed to dry in the straining state described above. When the glue is dry, the frame parts 1 and 2 can be opened, and the excess diaphragm surrounding the diaphragm 3, fastened to the frame 20, can be cut. The diaphragm 3 strained on the frame 20 maintains its tension due to the glue adhesion.

As an alternative to glue, e.g. diffusion welding or ultrasonic welding can be used. In these methods, the frame 20 has been formed suitable for the welding method. When the frame 20 has been strained against the diaphragm 3 by bringing the frame 20 against the diaphragm 3, and possibly by protruding the diaphragm, a counter-electrode according to the method used is brought from the opposite side of the diaphragm 3, which counter-electrode substitutes for the part 19, and whereby the diaphragm 3 is pressed against the frame 20, and the required joint is made between the diaphragm 3 and the frame 20, by e.g. ultrasonic welding.

Figure 6:
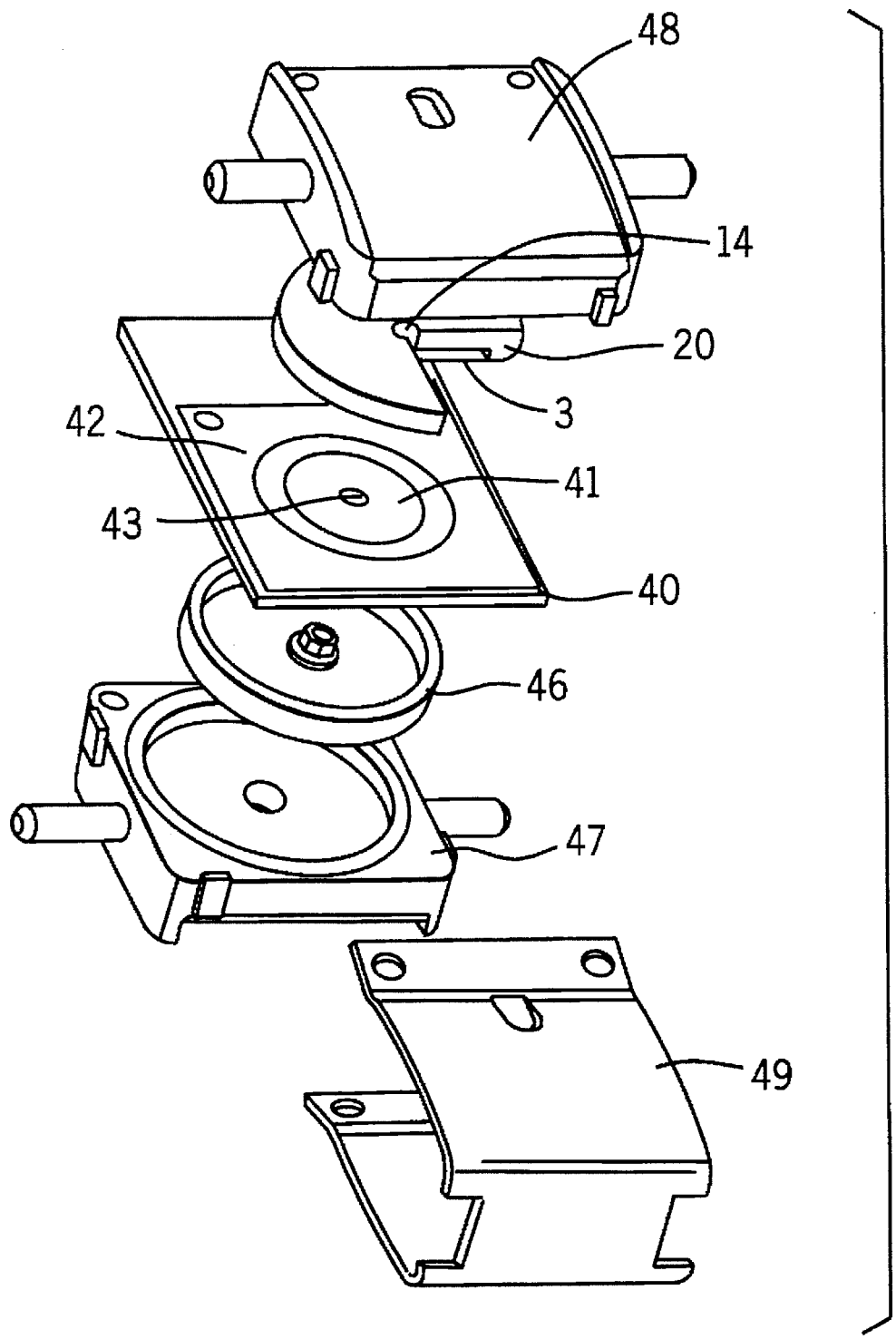
FIG. 6 presents an exploded view of one exemplary embodiment of the invention as a pressure difference member.

A frame 20 and a diaphragm 3 produced by the straining methods described above, are used i.a. as a pressure difference member of a differential pressure sensor according to FIG. 6. An aluminum oxide based hybrid circuit 40 has been used in the pressure sensor as the electrical circuit coupling bed and also as the mechanical part of the sensor, due to its thermal stability, insulation capacity and simple manufacturing techniques. On one side of the hybrid circuit 40 has been printed the required conductor figure directly on the surface of the hybrid circuit 40. The figure forms on the diaphragm the counter-electrode 41 and the conductor ring 42 required for the electrical coupling, which conductor ring is on a higher level than the surface of the electrode. This difference of height can be realized either by printing the ring by a thicker print using hybrid circuit techniques, or by adding between the printed ring and the diaphragm a separate ring-shaped intermediate ring. The frame 20 is mechanically pressed against the surface of the hybrid circuit. The diaphragm 3 comes in contact with the hybrid circuit in the ring area, which is higher than the counter-electrode. Between the diaphragm and the electrode is left an air gap. The distance of the diaphragm from the electrode is 20 μm. The hybrid circuit has been provided with a hole 43 for the conducting of the pressure to the air gap formed by the diaphragm and the electrode. The pressure to the other side of the diaphragm is conducted via the hole 14 in the frame 20. The pressure affects the diaphragm 3 through a relief cut in the frame 20.

The electrode 41 has been directly electrically connected to one side of the hybrid circuit. The other side of the hybrid circuit behind the electrode is used for electronics coupling, by which a short distance between the electrode and the coupling is achieved. This is beneficial with respect to the coupling of disturbances and diffusion quantities, as the coupling contains an extremely high impedance level. The coupling is further protected against external disturbances by a ground plane 46, through which the pressure is lead via the hybrid circuit hole to the diaphragm 3. The frame 20, the hybrid plate including its couplings, and the required gas connection units 47 and 48 are connected mechanically by the clamp 49, as presented in the exploded view of FIG. 6.

It is also obvious that the diaphragm fastened and strained between the frame bodies can be utilized as such.

The electrical conductivity or non-conductivity can be achieved by varying the electrical conductivity of the projections 7, 8 or 10 and 11 and/or the surface materials of the diaphragms. The diaphragm can be connected electrically by the plane parts or by a separate conductor straight from the surface of the diaphragm.

Figure 7:
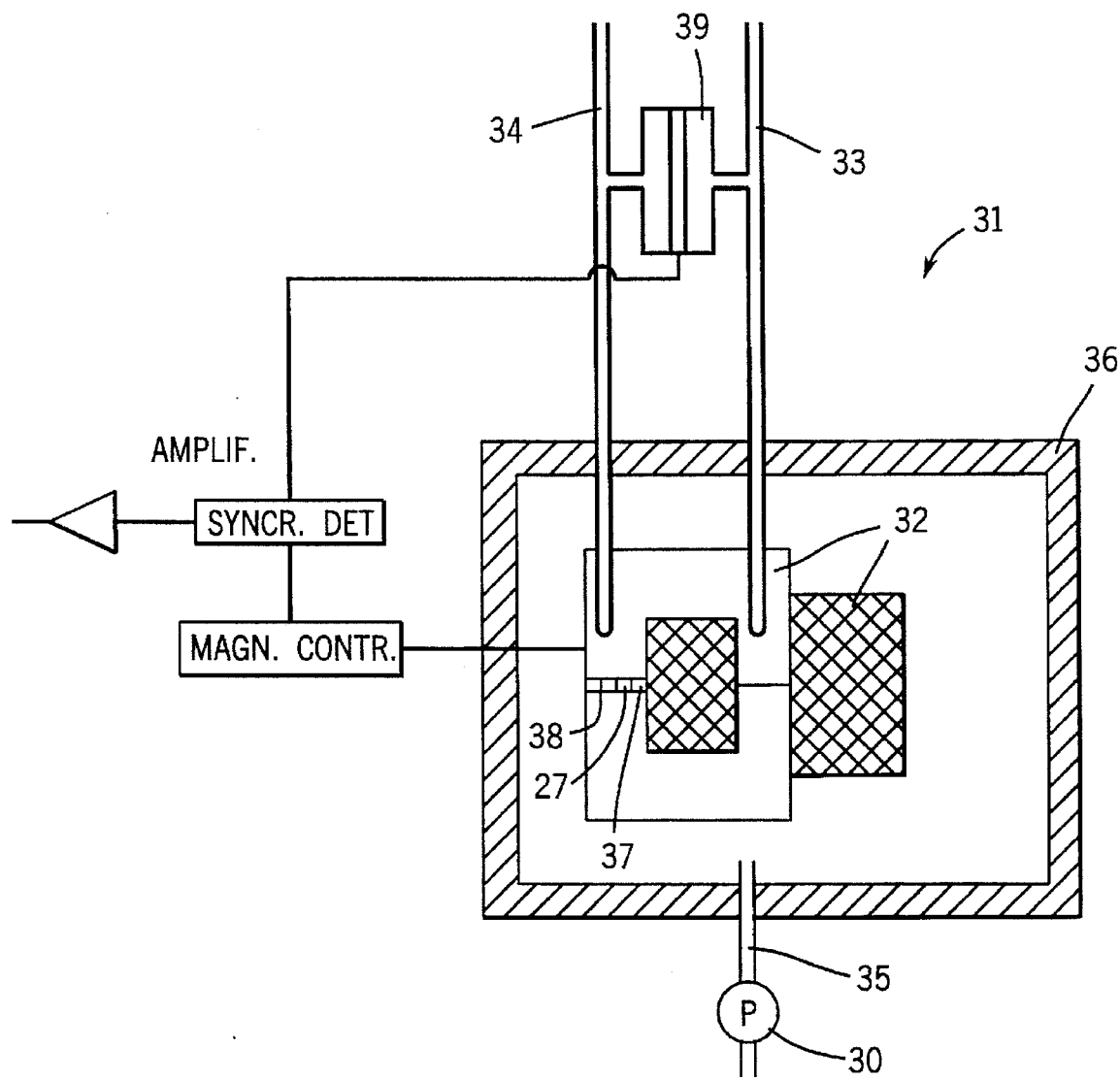
FIG. 7 presents the use of the FIG. 6 embodiment example as part of a gas measuring application.

A special application of the pre-strained diaphragm is that it forms part of the hybrid circuit, thus functioning as a differential or absolute pressure sensor, as shown in FIG. 7. A diaphragm strained and fastened according to the above mentioned methods can be used in a measuring device 31 for measuring oxygen content in a gas mixture according to the U.S. Pat. No. 4,633,705, which measuring device comprises an electro-magnet 32, being in the above mentioned closed chamber 36, to magnetize the gas flow flowing in the sample and reference gas conduits, between which gas conduits 33 and 34 is provided a differential pressure sensor 39 to measure the pressure fluctuations between the gas conduits and to change these pressure fluctuations into electric current, and that at least to one side of the diaphragm is provided a gas connection 33 and/or 34. The signal is indicated to the magnet control by a synchronized detector and is filtered and amplified according to need.

The diaphragm has in this solution been strained on the frame 20 of the differential pressure sensor 39, which is not shown in the picture, using the method above, in which the diaphragm is first strained on a wider area and thereafter a portion of such a strained diaphragm is fastened to the frame 20, which maintains the tension and possibly is further strained into its final tension. The sample and reference gas is brought to the magnetic field between the magnetic poles along the gas conduits 33 and 34. The platforms 37 and 38 preferably surrounding the gas inflow hole 27 between the poles assist the mixing of the gases, whereafter the gas can preferably be emitted into the surrounding closed chamber 36. The mixed gas is discharged from the chamber 36 along the connection 35 by the pump 30.

Figure 9:
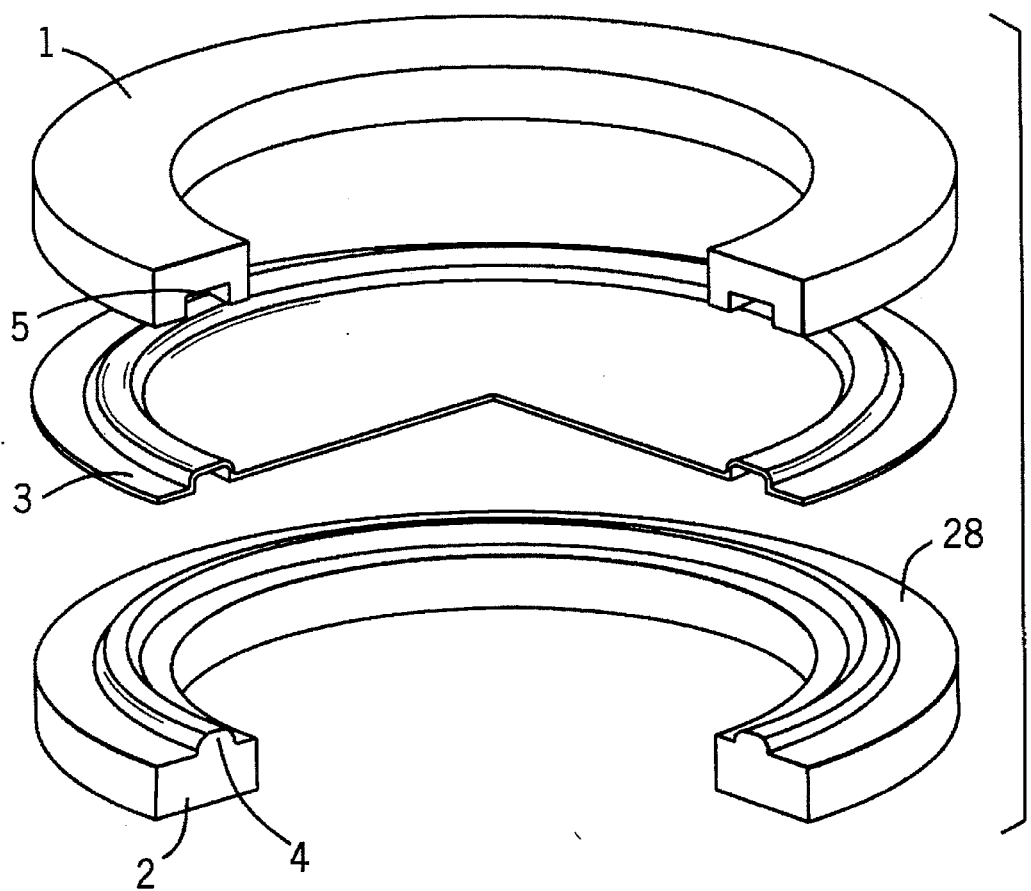
FIG. 9 shows an exploded view of an additional embodiment of the straining device.

FIG. 9 presents an exploded view of a diaphragm straining device, in which the resilient body is formed into one piece with one frame part. A rise has thus been formed on the surface 28, which is a resilient body. FIG. 8 shows an embodiment where the resilient body and the projection are discontinuous.

The resilient body, which preferably is circular, touches the diaphragm when the frame parts are pressed against each other essentially on the circular surface. The head and rear ends of the resilient body are connected, i.a. are preferably formed of one uniform piece. The resilient body is generally provided with an opening, by which the frame part can possibly be provided with the corresponding opening. The resilient body can be a piece attached to the frame part, which piece can be part of the frame part.

Figure 10A:
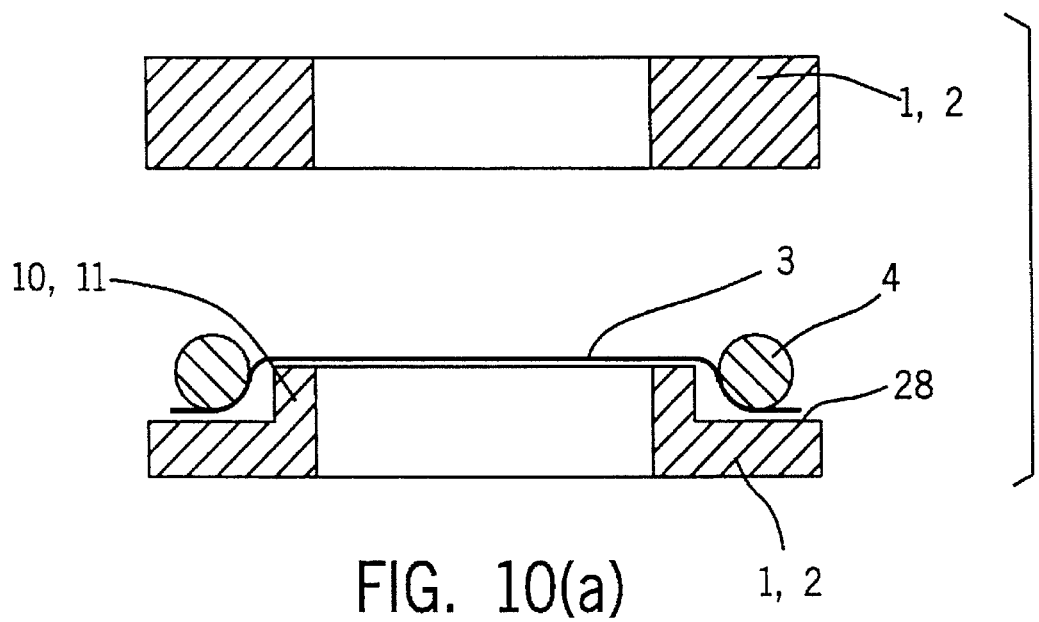
FIG. 10 presents different cross-sections of the frame.
Figure 10B:
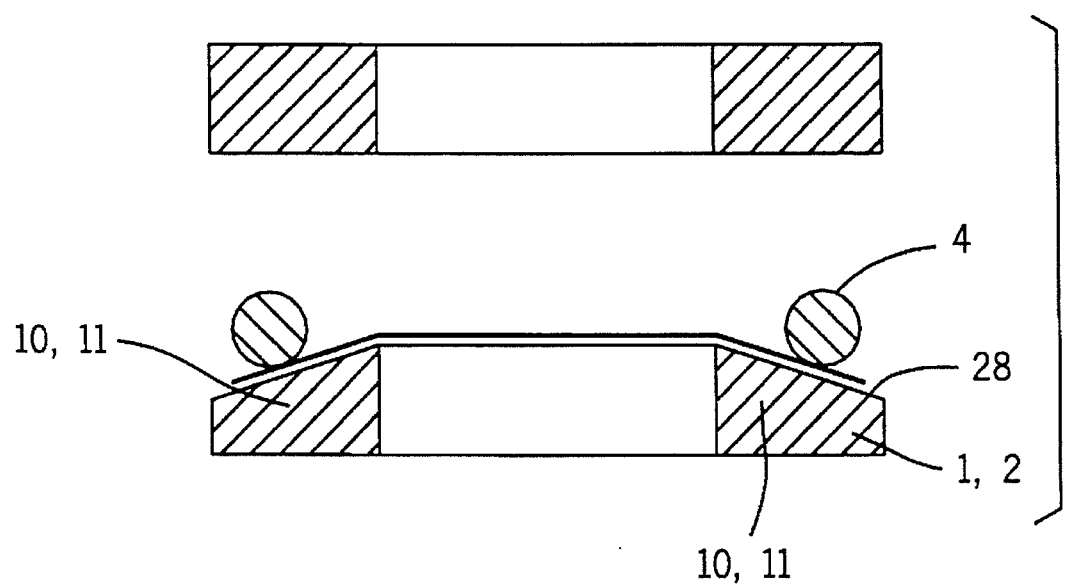

FIG. 10 shows exploded different cross-sections of two simple straining solutions. Below is described a preferable use of a different frame and a resilient body when straining a diaphragm into a certain tension. The surface 28 against the diaphragm 3 of the frame part 1 has been provided with a projection 10, 11. The internal diameter of the resilient body 4 is equall to or bigger than the external diameter of the projection. The external diameter of the projection corresponds preferably essentially to the internal diameter of the resilient body 4, the diaphragm coming between the resilient body 4 and the projection 10, 11. The objective of the projection is to prevent the resilient body from moving inwards. In case of an inclined plane, the internal diameter of the resilient body is preferably bigger than the highest point of the diameter of the inclined plane. The height of the resilient body is before pressing bigger than total height of the projection. When pressing, the frame parts touch each other leaving the diaphragm in between. The resilient member is supported in at least one frame part 1, 2 from its surface 28, 29 by at least some protruding part 7, 8, 10, 11.

The subject invention has been described only with reference to one of its preferable embodiments. The invention is not to be considered as so restricted, but several modifications within the scope of the inventive idea presented in the claims are possible, the diaphragm can e.g. be a metallic diaphragm, a thin metal diaphragm or a non-metallic diaphragm, having a thickness of e.g. 1–500 μm, preferably 2–25 μm and more preferably about 5 μm.

We claim:

1. A method of straining a diaphragm to provide a desired tension therein, said method comprising the steps of:

providing a first frame part and a second frame part, at least one of said frame parts having a projection defining the periphery of an interior area surrounded by the projection;

providing an annular, resilient body having a configuration such that said annular, resilient body can lie around the exterior of the projection;

placing the diaphragm adjacent one of the first and second frame parts so that the diaphragm is aligned with the area defined by the projection;

placing the annular, resilient body intermediate one of the frame parts and the diaphragm so that the annular, resilient body can lie around the exterior of the projection when the first and second frame parts are contiguous;

orienting the first frame part and the second frame part in an opposed relationship with the diaphragm therebetween and with said projection on said one of said frame parts extending toward the other of said frame parts;

pressing the first and second frame parts together to bring the diaphragm into engagement with the annular resilient body to strain the diaphragm;

fastening the diaphragm in the strained state on at least one of the first and second frame parts; and removing frame parts that are not fastened together.

2. A method according to claim 1, characterized in that the resilient body is an integral part of the one of said frame parts.

3. A method according to claim 1 characterized in that the resilient body is separate from said one of said frame parts.

4. A method according to claim 1, characterized in that the step of fastening the diaphragm on one of the frame parts is carried out by gluing, welding or by fastening the diaphragm and one of the frame parts to each other mechanically.

5. A method according to claim 1, characterized in that the engagement between the resilient body and the diaphragm is essentially along a circular surface.

6. A method according to claim 1, characterized in that two concentric projections are positioned on said at least one of the first and second frame parts to form a groove, into which the resilient body can be placed.

7. A method according to claim 1, characterized in that the annular resilient body is an O-ring.

8. A method according to claim 1, characterized in that the first and second frame parts are ring-shaped having an opening in the center.

9. A method according to claim 1 characterized in that said projection completely surrounds the interior area.

10. A method according to claim 1 characterized in that said projection intermittently surrounds the interior area.

11. A method according to claim 1 characterized in that said projection is inclined with respect to said one of said frame parts.

12. A method of straining a diaphragm to provide a desired tension therein, said method comprising the steps of:

providing a first frame part and a second frame part, at least one of said frame parts having a projection defining the periphery of an interior area surrounded by the projection;

providing an annular, resilient body having a configuration such that said annular, resilient body can lie around the exterior of the projection;

placing the diaphragm adjacent one of the first and second frame parts so that the diaphragm is aligned with the area defined by the projection;

placing the annular, resilient body intermediate one of the frame parts and the diaphragm so that the annular, resilient body can lie around the exterior of the projection when the first and second frame parts are contiguous;

orienting the first frame part and the second frame part in an opposed relationship with the diaphragm therebetween and with said projection on said one of said frame parts extending toward the other of said frame parts;

pressing the first and second frame parts together to bring the diaphragm into engagement with the annular resilient body to strain the diaphragm;

retaining the diaphragm in the strained state on at least one of the first and second frame parts; and attaching a third frame part to the strained diaphragm positioned between the first and second frame parts to define an area of the strained diaphragm parts less than the area of diaphragm tensioned between the first and second frame parts.

13. The method according to claim 12, further comprising the step of positioning a fourth frame part having a second resilient body on the opposite side of the strained diaphragm from the third frame part, such that the strained diaphragm is positioned between the third frame part and the second resilient body; and pressing the third and fourth frame parts together to bring the diaphragm into engagement with the second resilient body to further strain the diaphragm.

14. A device having a diaphragm strained to a desired tension, said device comprising:

a first frame part and a second frame part, said first and second frame parts being contiguous, at least one of said frame parts having a projection extending toward the other frame part and defining the periphery of an interior area surrounded by the projection, said projection having an exterior surface;

an annular, resilient body intermediate said first and second frame parts, said resilient annular body being aligned with the exterior surface of the projection; and a diaphragm intermediate said first and second frame parts and spanning the interior area defined by the projection;

said annular, resilient body being intermediate one of the frame parts and the diaphragm, said diaphragm being pressed into engagement with the annular, resilient body to strain the diaphragm to the desired tension and being maintained in said state by the contiguity of said first and second frame parts;

said first and second frame parts being detachable with the diaphragm remaining in its tensioned state and the resilient body and the diaphragm being fastened to each other.

15. A device according to claim 14, characterized in that a surface of at least one frame part coming opposite the other frame part is provided with two projections, which define a groove for receiving the resilient body.

16. A device according to claim 14, characterized in that the height of the compressed resilient body is essentially the same as the height of the projection on said at least one of the first and second frame parts.

17. A device according to claim 14, characterized in that the first and second frame parts are ring-shaped.

18. A device according to claim 16, characterized in that the resilient body is essentially ring-shaped having an opening in the middle.

19. A device according to claim 14, further defined as part of a measuring device measuring the oxygen content of a gas mixture.

20. A device according to claim 14 further defined as a pressure sensor to be placed between two gas conduits, said pressure sensor comprising a hybrid circuit having a conductor surface and a conductor ring having a height greater than the conductor surface, a ground plane having a pair of openings for gas flow, a casing, and a frame having a strained diaphragm positioned on said conductor ring opposite said conductor surface with a pressure effect on at least one side of said diaphragm.

21. A device according to claim 14 characterized in that said projection completely surrounds the interior area.

22. A device according to claim 14 characterized in that said projection intermittently surrounds the interior area.

23. A device according to claim 14 characterized in that said projection is inclined with respect to said one of said frame parts.

24. An apparatus for straining a diaphragm to a desired tension, said apparatus comprising:

a first frame part and a second frame part, said first frame part and said second frame part being juxtapositionable in an opposing relationship and movable into contiguity, at least one of said frame parts having a projection extending toward the other frame part and defining the periphery of an interior area surrounded by the projection, said projection having an exterior surface; and an annular, resilient body having a configuration such that said annular, resilient body can be aligned with said exterior surface of the projection, the diaphragm to be strained being placed adjacent one of the first and second frame parts so that the diaphragm spans the interior area defined by the projection;

the annular, resilient body of said apparatus being intermediate one of the frame parts and the diaphragm and so that the annular, resilient body is aligned with the exterior surface of said projection when the first and second frame parts are contiguous;

said diaphragm being pressed into engagement with the annular, resilient body to strain the diaphragm to the desired tension when said first and second frame parts are rendered contiguous, said apparatus having a third frame part for application to the strained diaphragm positioned between contiguous first and second frame parts to define an area of the strained diaphragm parts less than the area of diaphragm tensioned between the first and second frame parts.

25. The apparatus according to claim 24 wherein said resilient body is an integral part of one of said frame parts.

26. The apparatus of claim 24 wherein said resilient body is separate from said one of said frame parts.

27. The apparatus according to claim 24 wherein a surface of at said least one frame part is provided with two projections which define a groove for receiving the resilient body.

28. An apparatus according to claim 24 wherein said projection completely surrounds the interior area.

29. An apparatus according to claim 24 wherein said projection intermittently surrounds the interior area.

30. An apparatus according to claim 24 wherein said projection is inclined with respect to said one of said frame parts.

31. The apparatus according to claim 24 wherein said resilient body comprises an O-ring.

32. The apparatus according to claim 24 wherein said first and second frame parts are ring-shaped having an opening in the center.

* * * * *